United States Patent [19]

Ochs

[11] Patent Number: 5,136,892

[45] Date of Patent: Aug. 11, 1992

[54] VARIABLE SPEED SHAFT DRIVE MECHANISM FOR BICYCLES

[76] Inventor: David N. Ochs, 76 S. Sierra Madre St., #208, Colorado Springs, Colo. 80903

[21] Appl. No.: 764,883

[22] Filed: Sep. 24, 1991

[51] Int. Cl.$^5$ .......................... F16H 15/08; B62M 9/00
[52] U.S. Cl. .......................................... 74/194; 74/197; 74/206; 280/238; 192/46; 192/64
[58] Field of Search ................. 74/190, 194, 197, 206; 280/234, 236, 238, 259, 260

[56] References Cited

U.S. PATENT DOCUMENTS

| | | | |
|---|---|---|---|
| 497,676 | 5/1893 | Moffatt | 74/197 X |
| 633,666 | 9/1899 | Stewart | 74/197 X |
| 3,934,481 | 1/1976 | Foster | 74/194 X |
| 4,447,068 | 5/1984 | Brooks | 280/238 X |

Primary Examiner—Allan D. Herrmann
Assistant Examiner—David W. Laub
Attorney, Agent, or Firm—William E. Hein

[57] ABSTRACT

A variable speed shaft drive system for bicycles employs a drive shaft that is generally horizontally coupled between the pedals and the rear wheel of the bicycle. A pinion gear at the forward end of the drive shaft is engaged by a ring gear driven by the pedals to transmit drive power from the pedals to the drive shaft. A drive head at the rear end of the drive shaft frictionally engages a drive pick-up plate mounted to the rear wheel of the bicycle to transmit drive power from the rotating drive shaft to the rear wheel. Infinitely variable speed control is achieved by means of a shifting fork actuated by the user to position the drive head at selected distances from the center of the drive pick-up plate. Alternatively, a second drive head/pick-up ring combination may be substituted for the ring gear/pinion gear combination driven by the pedals to provide even smoother operation. The second drive head may be positioned a fixed distance from the center of its associated pick-up ring or it may also be made variable, resulting in a dual variable speed shaft drive to provide a greater range of speed ratios selectable by the rider.

3 Claims, 2 Drawing Sheets

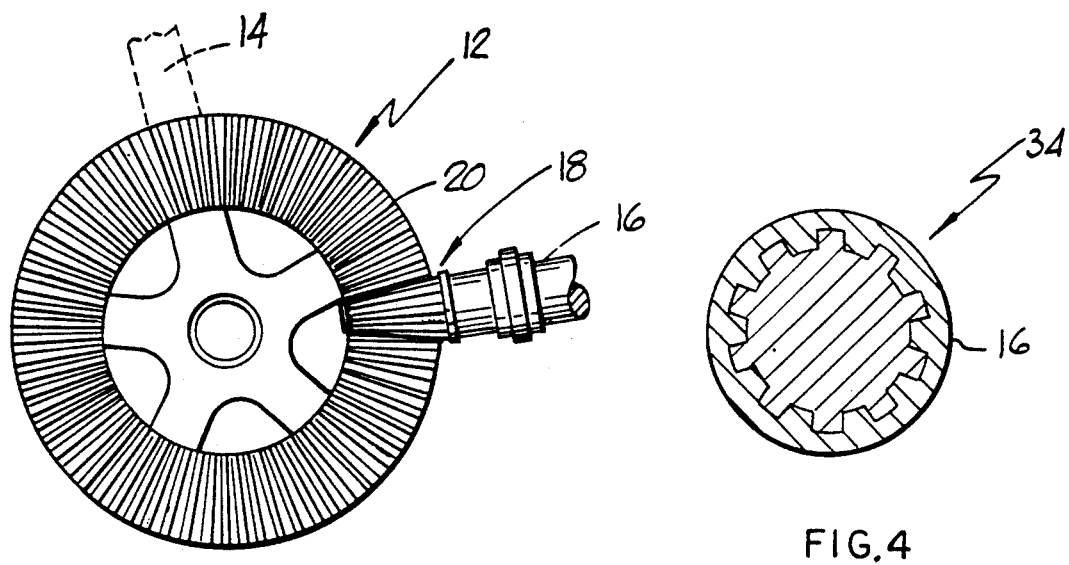
FIG.3
FIG.4
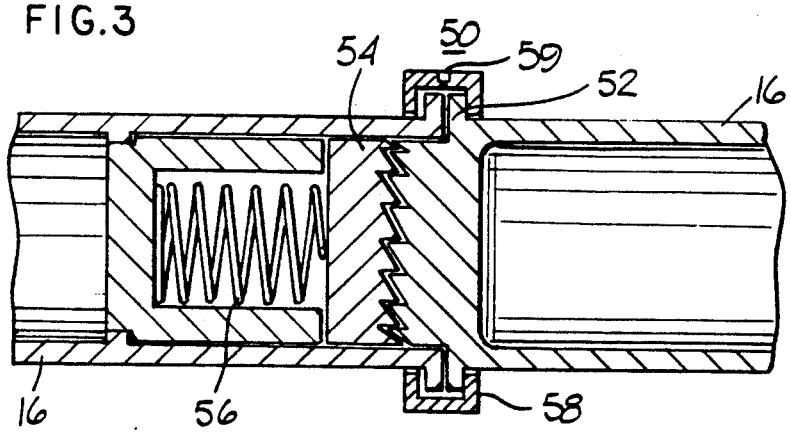
FIG.5

VARIABLE SPEED SHAFT DRIVE MECHANISM FOR BICYCLES

BACKGROUND AND SUMMARY OF THE INVENTION

This invention relates generally to bicycles and more specifically to drive mechanisms for bicycles. For decades, bicycles having multiple gear selection have conventionally employed a floating looped drive chain connected between a pedal gear and a rear wheel sprocket set. Gear shifting in these prior art bicycles has typically been accomplished through the use of a derailer that moves the drive chain from one rear wheel sprocket to another to effect a change in the drive ratio selected by the rider. The drive chain/derailer combination typically employed in these prior art bicycles suffers a number of disadvantages. Among them is a tendency of the drive chain and sprocket to snag and damage the rider's pant leg. Many riders choose to use a bicycle clip to keep the pant legs away from this mechanism. However, the chain itself attracts soil because it must be periodically lubricated to insure proper operation. As a result, this soil is often transmitted to the pant leg of the rider. Drive chains are susceptible to flipping off the various sprockets, and they tend to bind in positions off the sprockets. These conditions cause loss of drive power and require repair to reposition the chain. Finally, these prior art bicycle drive mechanisms are noisy as the result of the chain traversing the various sprockets during gear shifting operations initiated by the rider.

It is therefore the principal object of the present invention to provide a bicycle drive mechanism that totally eliminates the prior art drive chain/derailer mechanism and that instead employs a variable speed shaft drive mechanism that is smooth and efficient in operation and provides the user with an unlimited selection of drive ratios.

This and other objects are accomplished in accordance with the illustrated preferred embodiment of the present invention by providing a drive shaft that is coupled between the pedals and the rear wheel of the bicycle. A pinion gear at the forward end of the drive shaft is engaged by a ring gear mounted to the pedals to transmit drive power from the pedals to the drive shaft. A drive head at the rearward end of the drive shaft frictionally engages a circular flat drive pick-up plate mounted to the rear wheel of the bicycle to transmit drive power from the rotating drive shaft to the rear wheel. Infinitely variable speed control is implemented by a shifting fork actuated by the user to position the drive head at selected distances from the center of the drive pick-up plate. Alternatively, a second drive head/pick-up plate combination may be substituted for the ring gear/pinion gear combination driven by the pedals to provide even smoother operation. The second drive head may be positioned a fixed distance from the center of its associated pick-up plate or it may also be made variable, resulting in a dual variable speed shaft drive to provide a greater range of speed ratios selectable by the rider.

BRIEF DESCRIPTION OF THE DRAWINGS

FIG. 3 is a diagram illustrating the way in which a pinion gear at the forward end of the drive shaft of FIG. 1 engages a ring gear driven by the bicycle pedals.

FIG. 4 is a cross-sectional diagram illustrating a spline joint that couples drive head and rear shaft sections of the drive shaft of FIGS. 1 and 2 for longitudinal movement of the drive head over a flat drive pick-up plate mounted to the rear wheel to thereby achieve infinitely variable speed control.

FIG. 5 is a detailed diagram of a coaster clutch employed in the variable speed shaft drive mechanism of FIGS. 1 and 2.

DETAILED DESCRIPTION OF THE INVENTION

Figure 1:
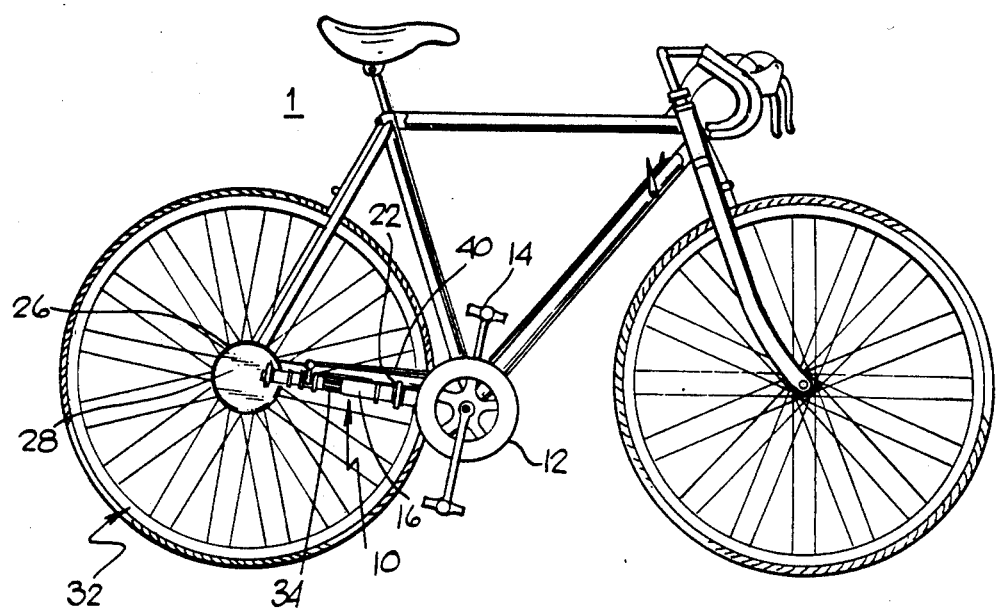
FIG. 1 is a pictorial diagram of a bicyle employing a variable speed shaft drive mechanism constructed in accordance with the preferred embodiment of the present invention.
Figure 2:
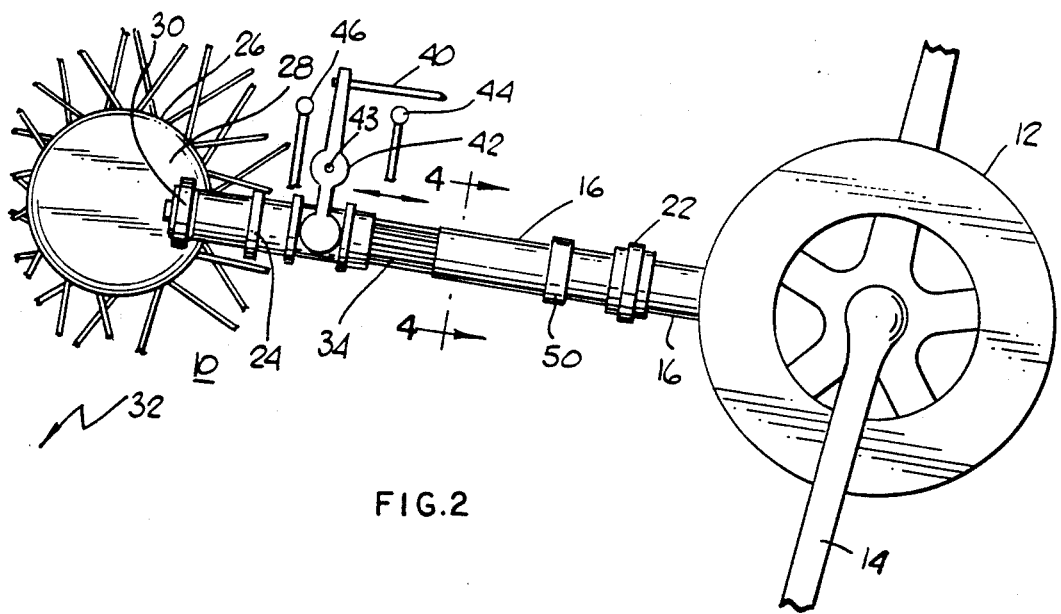
FIG. 2 is a detailed pictorial diagram of the variable speed shaft drive mechanism of FIG. 1.

Referring now to FIGS. 1 and 2, there is shown a bicycle 1 incorporating a variable speed shaft drive mechanism 10 that includes a drive ring 12 mounted for rotation in concert with bicycle pedals 14. Gear teeth 20 are provided on one side of drive ring 12 for engagement with a pinion gear 18 positioned at the forward end of a drive shaft 16, as illustrated in the detailed diagram of FIG. 3. Drive shaft 16 is appropriately attached to a conventional bicycle frame by way of front and rear shaft bearings 22 and 24, for example. A drive pick-up plate 26 having a smooth, flat face 28 is fixedly mounted to the rear wheel 32 of bicycle 1 so as to rotate in concert therewith. The diameter of drive pick-up plate 26 is chosen to provide a desired range of drive speed ratios.

A drive head 30 is mounted at the rearward end of drive shaft 16. Drive head 30 may be attached to drive shaft 16 in any of a number of conventional ways such that those elements rotate in concert and slippage therebetween is prevented. For example, the rear end of drive shaft 16 may have a knurled face against which drive head 30 is tightened by means of a retainer washer held in place on drive shaft 16 by one or more set screws. Drive head 30 is positioned in frictional engagement against face 28 of drive pick-up plate 26 such that the rotation of drive head 30 imparts a tangential force to drive pick-up plate 26, thereby driving rear wheel 32. The amount of pressure applied against drive pick-up plate 26 by drive head 30 may be adjusted by means of rear shaft bearing 24, which may include any of a number of conventional screw adjustment or spring loading techniques for that purpose. Drive head 30 may comprise any of a number of commercially available materials such as rubber that provide the required frictional engagement with drive pick-up plate 28 in a manner that also results in zero to minimal slippage between those two components.

A conventional shaft spline joint 34, illustrated in cross section in FIG. 4, permits forward and rearward motion of drive head 30 along the longitudinal axis of drive shaft 16 such that drive head 30 engages drive pick-up ring 28 at a selected distance from the center thereof, thereby permitting control of the rotational speed of rear wheel 32 and, in turn, the overall speed of bicycle 1, for a given speed of rotation of drive shaft 16. The rider may conveniently adjust the speed of bicycle 1 by means of an actuator member 40 coupled to a shifting fork 42 that is pivotally connected to the bicycle frame at a pivot point 43 and that serves to impart longitudinal motion to that portion of drive shaft 16 that is rearward of spline joint 34. Actuator 40 may comprise, for example, a rigid shifting rod or a cable that terminates in a lever mounted on the handlebars or forward frame area of the bicycle 1 so as to be readily accessible to the rider. If desired, front and rear fork stops 44 and 46 may be provided on the bicycle frame to limit the forward and rearward travel of shifting fork 42.

A coaster clutch 50, the details of which are illustrated in FIG. 5, is provided at a desired point along drive shaft 16 to permit motion of the bicycle 1 during those periods of time when the bicycle in in motion but the pedals 14 are stationary. Coaster clutch 50 may comprise, for example, a fixed gear 52 on the forward or drive side of coaster clutch 50 and a floating gear 54, that faces fixed gear 52, on the rearward side of coaster clutch 50. Fixed gear 52 may be fabricated as an integral part of the drive shaft 16, while floating gear 54 is splined for movement toward and away from fixed gear 52 along the longitudinal axis of drive shaft 16. A spring 56 urges floating gear 54 into engagement with fixed gear 52 when a driving force is applied to drive shaft 16 through the pedals 14. Drive shaft 16 is flanged at coaster clutch 50, and a retainer ring 58 serves to retain the two flanged sections of drive shaft 16. A lubrication port 59 may be appropriately provided on retainer ring 58 to provide lubrication for the two flanged sections of drive shaft 16 as they rotate with respect to each other within retainer ring 58. The degree of bevel of teeth that are provided on both fixed gear 52 and floating gear 54 is selected in accordance with well known mechanical engineering considerations such that proper ratcheting of the coaster clutch 50 occurs when the bicycle and rider are in the coasting mode.

In accordance with alternative embodiments of the present invention, the gear teeth 20 on drive ring 12, as well as those on pinion gear 18, are eliminated and replaced with a forward frictional drive mechanism similar to the rear frictional drive comprising drive head 30 and drive pick-up plate 26 that serves to drive rear wheel 32. In one such embodiment, the forward frictional drive mechanism employs a drive head that is located a fixed distance from the center of a drive pick-up plate driven by pedals 14. Alternatively, the drive head of the forward frictional drive mechanism may be positioned a variable distance from the center of its associated drive pick-up ring in the same manner as described hereinabove in connection with rear drive head 30 and associated drive pick-up plate 26. This latter arrangement results in a dual variable speed drive arrangement that provides the rider with additional speed ratio adjustment and control.

I claim:

1. A variable speed shaft drive mechanism for a bicycle comprising: a ring gear mounted for rotation in concert with pedals of the bicycle operated by a rider, the ring gear having a plurality of evenly spaced teeth fabricated on a peripheral surface thereof;
   a drive shaft substantially horizontally positioned between said ring gear and a rear wheel of the bicycle, the drive shaft being mounted for rotation within a plurality of bearings attached to a frame of the bicyle and having forward and rearward sections coupled for longitudinal motion with respect to each other;
   a circular drive plate mounted concentrically with the rear wheel of the bicycle for rotation in concert therewith, said drive plate having a flat driving surface;
   a pinion gear mounted at a forward end of the forward section of said drive shaft for engagement with the teeth of said ring gear such that said drive shaft is driven by rotation of said ring gear caused by actuation of the pedals by the rider;
   a circular drive head mounted at a rearward end of the rearward section of said drive shaft for rotation in concert therewith, said circular drive head having a peripheral surface engaging said flat driving surface of said drive plate to thereby drive said drive plate;
   shifting means actuable by the rider, said shifting means being coupled to the rearward section of said drive shaft for causing longitudinal motion thereof to thereby selectively position said drive head at a desired distance from the center of said circular drive plate; and
   a coaster clutch coupled along said drive shaft to permit rotation of a section of said drive shaft rearward of said coaster clutch while a section of said drive shaft forward of said coaster clutch is stationary.

2. A variable speed shaft drive mechanism for a bicycle comprising: a forward circular drive plate mounted for rotation in concert with pedals of the bicycle operated by a rider, said forward circular drive plate having a flat driving surface;
   a drive shaft substantially horizontally positioned between said forward circular drive plate and a rear wheel of the bicycle, the drive shaft being mounted for rotation within a plurality of bearings attached to a frame of the bicyle and having forward and rearward sections coupled for longitudinal motion with respect to each other;
   a rearward circular drive plate mounted concentrically with the rear wheel of the bicycle for rotation in concert therewith, said rearward circular drive plate having a flat driving surface;
   a forward circular drive head mounted at a forward end of the forward section of said drive shaft for rotation in concert therewith, said forward circular drive head having a peripheral surface engaging said flat driving surface of said forward circular drive plate at a fixed distance from the center thereof to thereby drive said drive shaft in response to actuation of the pedals by the rider;
   a rearward circular drive head mounted at a rearward end of the rearward section of said drive shaft for rotation in concert therewith, said rearward circular drive head having a peripheral surface engaging said flat driving surface of said rearward circular drive plate to thereby drive said rearward circular drive plate;
   shifting means actuable by the rider, said shifting means being coupled to the rearward section of said drive shaft for causing longitudinal motion thereof to thereby selectively position said rearward circular drive head at a desired distance from the center of said rearward circular drive plate; and
   a coaster clutch coupled along said drive shaft to permit rotation of a section of said drive shaft rearward of said coaster clutch while a section of said drive shaft forward of said coaster clutch is stationary.

3. A dual variable speed shaft drive mechanism for a bicycle comprising:

a forward circular drive plate mounted for rotation in concert with pedals of the bicycle operated by a rider, said forward circular drive plate having a flat driving surface;

a drive shaft substantially horizontally positioned between said forward circular drive plate and a rear wheel of the bicycle, the drive shaft being mounted for rotation within a plurality of bearings attached to a frame of the bicycle and having forward and rearward sections coupled for longitudinal motion with respect to each other;

a rearward circular drive plate mounted concentrically with the rear wheel of the bicycle for rotation in concert therewith, said rearward circular drive plate having a flat driving surface;

a forward circular drive head mounted at a forward end of the forward section of said drive shaft for rotation in concert therewith, said forward circular drive head having a peripheral surface engaging said flat driving surface of said forward circular drive plate at a fixed distance from the center thereof to thereby drive said drive shaft in response to actuation of the pedals by the rider;

a rearward circular drive head mounted at a rearward end of the rearward section of said drive shaft for rotation in concert therewith, said rearward circular drive head having a peripheral surface engaging said flat driving surface of said rearward circular drive plate to thereby drive said rearward circular drive plate;

forward shifting means actuable by the rider, said forward shifting means being coupled to the forward section of said drive shaft for causing longitudinal motion thereof to thereby selectively position said forward circular drive head at a desired distance from the center of said forward circular drive plate., and rearward shifting means actuable by the rider, said rearward shifting means being coupled to the rearward section of said drive shaft for causing longitudinal motion thereof to thereby selectively position said rearward circular drive head at a desired distance from the center of said rearward circular drive plate; and a coaster clutch coupled along said drive shaft to permit rotation of a section of said drive shaft rearward of said coaster clutch while a section of said drive shaft forward of said coaster clutch is stationary.

* * * * *